United States Patent [19]

Kubota et al.

[11] Patent Number: 4,506,000
[45] Date of Patent: Mar. 19, 1985

[54] MAGNETIC RECORDING MEDIUM

[75] Inventors: Isao Kubota, Tagajyo; Kunio Kobayashi, Izumi; Toshimi Miyao, Shiogama, all of Japan

[73] Assignee: Sony Corporation, Tokyo, Japan

[21] Appl. No.: 465,356

[22] Filed: Feb. 9, 1983

[30] Foreign Application Priority Data

Jul. 21, 1981 [JP] Japan .................. 56/113900

[51] Int. Cl.³ .................. G11B 5/70; H01F 10/02
[52] U.S. Cl. .................. 430/39; 430/56; 428/694
[58] Field of Search .................. 430/39, 56, 140; 428/694

[56] References Cited

U.S. PATENT DOCUMENTS

| | | | |
|---|---|---|---|
| 4,279,945 | 7/1981 | Audran et al. | 430/56 |
| 4,302,523 | 11/1981 | Audran et al. | 430/140 |
| 4,309,471 | 1/1982 | Suzuki et al. | 428/694 |
| 4,323,621 | 4/1982 | Kober et al. | 428/694 |
| 4,410,590 | 10/1983 | Kawahara et al. | 428/694 |

*Primary Examiner*—John E. Kittle
*Assistant Examiner*—John L. Goodrow
*Attorney, Agent, or Firm*—Hill, Van Santen, Steadman & Simpson

[57] ABSTRACT

A magnetic recording medium having a non-magnetic substrate, a first magnetic layer composed mainly of magnetic powder and binder and formed on the non-magnetic substrate, and a second magnetic layer composed mainly of magnetic powder and binder and formed on the first magnetic layer is disclosed. In this case, the magnetic powder of the first magnetic layer is made of ferro-magnetic metal powder which has a specific surface area of 20 to 40 m²/g measured according to BET adsorption method, the first magnetic layer has coercive force $H_{c1}$ of 800 to 1500 Oe, residual magnetic flux density of 3000 to 5000 Gausses and a thickness of more than 2μ, while the magnetic powders of the second magnetic layer is made of ferro-magnetic metal powder which has a specific surface area of 40 to 150 m²/g measured according to BET adsorption method, the second magnetic layer has coercive force $H_{c2}$ of 1000 to 2500 Oe, residual magnetic flux density of 2000 to 3000 Gausses and a thickness 0.1 to 2μ, and the coercive forces $H_{c1}$ and $H_{c2}$ are selected to satisfy $H_{c1} \leq H_{c2}$.

3 Claims, 6 Drawing Figures

FIG. 3

Characteristic Of Single Layer Magnetic Recording Medium

| | Magnetic Paint | Thickness of Magnetic Layer (μ) | Br (Gauss) | Hc (Oe) | MOL (db) 315Hz | MOL (db) 10kHz | Bias Noise (db) |
|---|---|---|---|---|---|---|---|
| Single Layer (1) | A | 5 | 3400 | 1200 | +3.5 | 0 | +1.0 |
| " (2) | A | 4 | 3400 | 1200 | +2.5 | 0 | +1.0 |
| " (3) | A | 3 | 3400 | 1200 | +1.5 | 0 | +1.0 |
| " (4) | A | 2 | 3400 | 1200 | +0.5 | 0 | +1.0 |
| " (5) | B | 4 | 2700 | 1200 | 0 | 0 | 0 |
| " (6) | C | 4 | 2400 | 1200 | -0.2 | 0 | -4.0 |
| " (7) | D | 5 | 2400 | 1500 | 0 | +3.5 | -4.0 |
| " (8) | D | 4 | 2400 | 1500 | -0.5 | +3.5 | -4.0 |
| " (9) | D | 3 | 2400 | 1500 | -1.0 | +3.5 | -4.0 |
| " (10) | D | 2 | 2400 | 1500 | -1.5 | +3.5 | -4.0 |
| " (11) | E | 4 | 2400 | 2000 | -1.5 | +7.0 | -4.0 |
| " (12) | F | 4 | 2000 | 1200 | -1.0 | 0 | -8.0 |
| " (13) | G | 4 | 2000 | 1500 | -1.3 | +3.5 | -8.0 |
| " (14) | H | 4 | 2000 | 2000 | -1.8 | +7.0 | -8.0 |
| " (15) | I | 5 | 4000 | 1200 | +6.0 | 0 | +1.5 |
| " (16) | I | 4 | 4000 | 1200 | +5.0 | 0 | +1.5 |
| " (17) | I | 3 | 4000 | 1200 | +3.5 | 0 | +1.5 |
| " (18) | I | 2 | 4000 | 1200 | +2.0 | 0 | +1.5 |
| " (19) | J | 5 | 4800 | 1200 | +8.5 | 0 | +2.5 |
| " (20) | J | 4 | 4800 | 1200 | +7.5 | 0 | +2.5 |
| " (21) | J | 3 | 4800 | 1200 | +6.5 | 0 | +2.5 |
| " (22) | J | 2 | 4800 | 1200 | +3.5 | 0 | +2.5 |

F I G. 4

Characteristic Of Double Layer Magnetic Recording Medium

| | Second (Upper) Magnetic Layer | | First (Lower) Magnetic Layer | | MOL (db) | | | Bias Noise (db) |
|---|---|---|---|---|---|---|---|---|
| | Magnetic Paint | Thickness (μ) | Magnetic Paint | Thickness (μ) | 315 Hz | 10 kHz | | |
| Example (1) | B | 1.0 | A | 3 | +1.5 | 0 | | 0 |
| " (2) | C | 1.0 | A | 3 | +1.0 | 0 | | −4.0 |
| " (3) | F | 1.0 | A | 3 | +0.5 | 0 | | −8.0 |
| " (4) | D | 1.0 | A | 3 | 0 | +1.5 | | −4.0 |
| " (5) | G | 1.0 | A | 3 | −0.5 | +3.5 | | −8.0 |
| " (6) | E | 1.0 | A | 3 | −0.7 | +7.0 | | −4.0 |
| " (7) | H | 1.0 | A | 3 | −1.0 | +7.0 | | −8.0 |
| " (8) | C | 1.0 | I | 3 | +3.0 | 0 | | −3.5 |
| " (9) | F | 1.0 | I | 3 | +2.5 | 0 | | −7.5 |
| " (10) | C | 1.0 | J | 3 | +6.0 | 0 | | −2.5 |
| " (11) | F | 1.0 | J | 3 | +5.5 | 0 | | −6.5 |
| " (12) | D | 1.0 | I | 3 | +2.0 | +3.5 | | −3.5 |
| " (13) | E | 1.0 | I | 3 | +1.7 | +7.0 | | −3.5 |
| " (14) | H | 1.0 | I | 3 | +1.0 | +7.0 | | −7.5 |
| " (15) | D | 1.0 | J | 3 | +5.5 | +3.5 | | −2.5 |
| " (16) | E | 1.0 | J | 3 | +4.7 | +7.0 | | −2.5 |
| " (17) | H | 1.0 | J | 3 | +3.5 | +7.0 | | −6.5 |

FIG. 5

Thickness And Characteristic Of Second (Upper) Magnetic Layer

| | Second (Upper) Magnetic Layer | | First (Lower) Magnetic Layer | | MOL (db) | | Bias Noise (db) |
|---|---|---|---|---|---|---|---|
| | Magnetic Paint | Thickness (μ) | Magnetic Paint | Thickness (μ) | 315 Hz | 10 kHz | |
| Example (18) | D | 0.1 | I | 3 | +3.5 | +2.5 | −3.0 |
| 〃 (19) | D | 0.5 | I | 3 | +3.0 | +3.0 | −3.5 |
| 〃 (20) | D | 1.0 | I | 3 | +2.0 | +3.5 | −3.5 |
| 〃 (21) | D | 2.0 | I | 3 | +1.5 | +3.5 | −4.0 |
| 〃 (22) | D | 0.5 | J | 3 | +6.5 | +2.5 | −3.0 |

FIG. 6

Thickness And Characteristic Of First (Lower) Magnetic Layer

| | Second (Upper) Magnetic Layer | | First (Lower) Magnetic Layer | | MOL (db) | | Bias Noise (db) |
|---|---|---|---|---|---|---|---|
| | Magnetic Paint | Thickness (μ) | Magnetic Paint | Thickness (μ) | 315 Hz | 10 kHz | |
| Example (23) | D | 1.0 | I | 2.0 | +0.5 | +3.5 | −4.5 |
| 〃 (24) | D | 1.0 | I | 3.0 | +2.0 | +3.5 | −4.5 |
| 〃 (25) | D | 1.0 | I | 4.0 | +5.0 | +3.5 | −4.5 |
| 〃 (26) | D | 1.0 | I | 6.0 | +7.0 | +3.5 | −4.5 |
| 〃 (27) | D | 1.0 | J | 2.0 | +2.0 | +3.5 | −4.5 |
| 〃 (28) | D | 1.0 | J | 6.0 | +10.0 | +3.5 | −4.5 | ns
MAGNETIC RECORDING MEDIUM

BACKGROUND OF THE INVENTION

1. Field of the Invention

The present invention relates generally to a magnetic recording medium and is directed more particularly to a magnetic recording medium having double magnetic layers.

2. Description of the Prior Art

A conventional magnetic recording medium, such as a metal tape which is made by such a manner that, for example, ferro-magnetic metal powders and binder are mixed and then coated on a non-magnetic substrate (the specific surface area of ferro-magnetic metal powders is about 30 m²/g) has large coercive force and large residual magnetic flux density so that the reproduced output therefrom is large over an entire frequency band but the bias noise level thereof is also large.

OBJECTS AND SUMMARY OF THE INVENTION

Accordingly, an object of the present invention is to provide a novel magnetic recording medium free from the defects inherent to the prior art.

Another object of the invention is to provide a magnetic recording medium from which such an output superior over an entire frequency band and low in noise (bias noise) can be reproduced.

According to an aspect of the present invention there is provided a magnetic recording medium, which comprises:

(a) a non-magnetic substrate;
(b) a first magnetic layer composed mainly of magnetic powder and binder and formed on said non-magnetic substrate; and
(c) a second magnetic layer composed mainly of magnetic powder and binder and formed on said first magnetic layer, the magnetic powder of said first magnetic layer being made of ferro-magnetic metal powder which has a specific surface area of 20 to 40 m²/g measured according to BET adsorption method, said first magnetic layer having coervice force $H_{c1}$ of 800 to 1500 Oe, residual magnetic flux density of 3000 to 5000 Gausses and a thickness of more than 2μ, the magnetic powders of said second magnetic layer being made of ferro-magnetic metal powders which have a specific surface area of 40 to 150 m²/g measured according to BET adsorption method, said second magnetic layer having coercive force $H_{c2}$ of 1000 to 2500 Oe, residual magnetic flux density of 2000 to 3000 Gausses and a thickness 0.1 to 2μ, and said coercive forces $H_{c1}$ and $H_{c2}$ being selected to satisfy $H_{c1} \leq H_{c2}$.

The other objects, features and advantages of the present invention will become apparent from the following description taken in conjunction with the accompanying drawings through which the like references designate the same elements and parts.

BRIEF DESCRIPTION OF THE DRAWINGS

FIG. 3 is a table representative of characteristics of various examples of a single layer magnetic recording medium;

FIG. 4 is a table representative of characteristics of respective examples of a double-layer magnetic recording layer according to the present invention;

FIG. 5 is a table showing the relationship between the thickness of the upper layer of the double-layer magnetic recording medium of the invention and the characteristics thereof; and FIG. 6 is a table showing the relationship between the thickness of the lower layer of the double-layer magnetic recording medium of the invention and the characteristics thereof.

DESCRIPTION OF THE PREFERRED EMBODIMENTS

Figure 1:
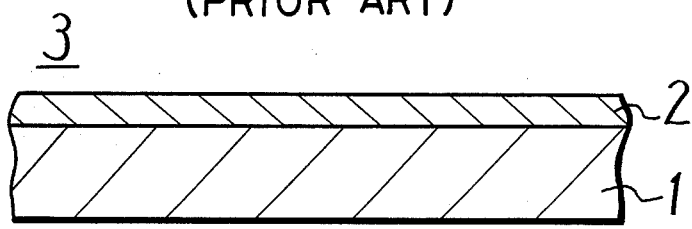
FIG. 1 is a cross-sectional view showing a conventional magnetic recording medium.

The present invention will be hereinafter described with reference to the attached drawings.

The inventors of this invention discovered from various experiments and studies the following fact. That is, if ferro-magnetic metal powders (including alloy) with a large specific surface area are distributed on the magnetic layer surface portion of a magnetic recording medium, the bias noise thereof is lowered, and if ferro-magnetic metal powders (including alloy) with a small specific surface area are distributed into the interior of the magnetic layer (i.e. lower layer below the middle portion in the thickness direction), the reproduced output therefrom becomes large over an entire frequency band.

Based upon the above discovered fact, the present invention is to make the magnetic layer of a magnetic recording medium as a double-layer structure, to suitably select the respective specific surface areas, coercive forces $H_c$, residual magnetic flux densities Br and thicknesses of its upper and lower magnetic layers, whereby while the reproduced output therefrom is maintained high, the bias noise therein is lowered.

The magnetic recording medium according to the present invention will be hereinbelow described with reference to examples.

EXAMPLES

| | |
|---|---|
| 1. Acicular ferro-magnetic iron powder having the specific surface area of 30 m²/g and the coercive force of 1300 Oe | 300 weight parts |
| Thermoplastic polyurethane resin (Estane 5702 manufactured by B. F. Goodrich Co.) | 25 weight parts |
| Vinylchloride-vinylacetate-vinylalcohol copolymer (VAGH manufactured by U.C.C. Co.) | 25 weight parts |
| Oleic acid | 6 weight parts |
| Methyl ethyl ketone | 440 weight parts |
| Cyclohexanone | 440 weight parts |

The above compositions are put into a ball mill and subjected to dispersion treatment in 24 hours. Then, 20 weight part of polyisocianate compound (Dismodur L-75 manufactured by Bayer A. G.) is added thereto and the mixture is subjected to a high shear dispersion in 2 hours to provide magnetic paint. This magnetic paint is taken as a magnetic paint A.

2. The ferro-magnetic iron powder in the above magnetic paint A is replaced by ferro-magnetic metal powder having the specific surface area of 40 m²/g and the coercive force of 1300 Oe (the remaining materials are same as those of the magnetic paint A), which is subjected to the same process as that of the magnetic paint A to prepare a magnetic paint which is referred to as a magnetic paint B.

3. The ferro-magnetic iron powder in the magnetic paint A is replaced respectively by ferro-magnetic metal powders having the specific surface area of 60 m$^2$/g and the coervice forces of 1300 Oe, 1600 Oe and 2100 Oe (the remaining materials are same as those of the magnetic paint A) and the compositions thus prepared are subjected to the process same as that of the magnetic paint A to provide magnetic paints which are called as magnetic paints C, D and E, respectively.

4. The ferro-magnetic iron powder in the magnetic paint A is replaced respectively by ferro-magnetic metal powders having the specific surface area 90 m$^2$/g and the coercive forces of 1300 Oe, 1600 Oe and 2100 Oe (the remaining materials are same as those of the magnetic paint A) and the compositions thus prepared are subjected to the process same as that of the magnetic paint A to provide magnetic paints which are called as magnetic paints F,G and H, respectively.

| 5. Acicular ferro-magnetic iron powder having the specific surface area of 30 m$^2$/g and the coercive force of 1300 Oe | 300 weight parts |
|---|---|
| Thermoplastic polyurethane resin | 15 weight parts |
| Vinylchloride-vinylacetate-vinylalcohol copolymer | 15 weight parts |
| Oleic acid | 6 weight parts |
| Methyl ethyl ketone | 250 weight parts |
| Cyclohexanone | 250 weight parts |

The above compositions are added together and then subjected to the process same as that of the magnetic paint A to provide a magnetic paint. This magnetic paint is referred to as a magnetic paint I

| 6. Acicular ferro-magnetic iron powder having the specific surface area of 30 m$^2$/g and the coercive force of 1300 Oe | 300 weight parts |
|---|---|
| Thermoplastic polyurethane resin | 10 weight parts |
| Vinylchloride-vinylacetate-vinylalcohol copolymer | 10 weight parts |
| Oleic acid | 6 weight parts |
| Methyl ethyl ketone | 240 weight parts |
| Cyclohexanone | 240 weight parts |

The above compositions are added together and then subjected to the process same as that of the magnetic paint A to provide a magnetic paint. This magnetic paint is referred to as a magnetic paint J.

The above ferro-magnetic metal powder can be prepared by such a manner that, for example, α-FeOOH (goethite) powders having various acicular ratio and particle size are subjected to the dehydration process and thereafter to the reduction process in hydrogen atmosphere to give a desired characteristic to the ferro-magnetic metal powder. In this case, since each of the ferro-magnetic metal powders takes over the shape and size of the starting material thereof, the characteristics thereof can be controlled by selecting the shape and size thereof. Needless to say, it is possible to add thereto other metals such as Co, Ni and so on, if necessary.

In the above examples, the specific surface area of the ferro-magnetic metal powders is such one as measured by the BET adsorption method.

The characteristics of the afore-said magnetic paints A to J are described on the following table in which P/B represents the weight ratio between the magnetic powder P and the binder B.

TABLE

| Magnetic Paint | Coercive Force H$_c$ of Magnetic Powder | Specific Surface Area | P/B | Residual Magnetic Flux density Br |
|---|---|---|---|---|
| A | 1300 Oe | 30 m$^2$/g | 6 | 3400 Gausses |
| B | 1300 Oe | 40 m$^2$/g | 6 | 2700 Gausses |
| C | 1300 Oe | 60 m$^2$/g | 6 | 2400 Gausses |
| D | 1600 Oe | 60 m$^2$/g | 6 | 2400 Gausses |
| E | 2100 Oe | 60 m$^2$/g | 6 | 2400 Gausses |
| F | 1300 Oe | 90 m$^2$/g | 6 | 2000 Gausses |
| G | 1600 Oe | 90 m$^2$/g | 6 | 2000 Gausses |
| H | 2100 Oe | 90 m$^2$/g | 6 | 2000 Gausses |
| I | 1300 Oe | 30 m$^2$/g | 10 | 4000 Gausses |
| J | 1300 Oe | 30 m$^2$/g | 15 | 4800 Gausses |

Each of the above magnetic paints A to J is coated on a non-magnetic substrate 1 (for example, polyethylene terephthalate film having the thickness of 12μ), subjected to orientation process in a magnetic field, dried and then subjected to the super-calender treatment to form a single magnetic layer 2 on the non-magnetic substrate 1 to thereby produce a magnetic recording medium 3 as shown in FIG. 1, which may correspond to a prior art magnetic recording medium.

Figure 2:
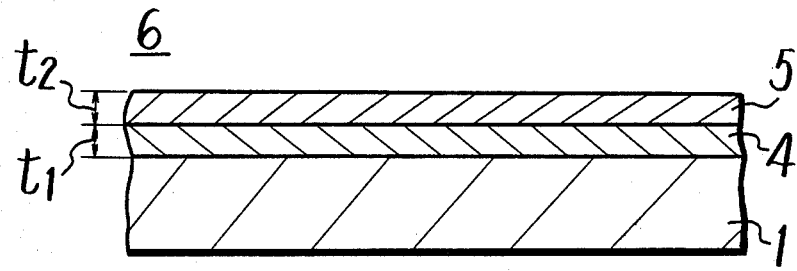
FIG. 2 is a cross-sectional view showing an example of the magnetic recording medium according to the present invention.

Further, as shown in FIG. 2, by using each of the similar magnetic paints A to J and also the similar process to the above, a first magnetic layer 4 is formed on the non-magnetic substrate 1. After the first magnetic layer 4 has been cured, a different magnetic paint is coated on the first magnetic layer 4 by the same process to form a second magnetic layer 5 thereon to thereby provide a double-layer magnetic recording medium 6 according to the present invention.

The magnetic characteristics (residual magnetic flux density Br and coercive force H$_c$), maximum output level (MOL), bias noise and so on of the respective magnetic recording mediums 3 and 6 were measured. The measured results are shown in the tables of FIGS. 3 to 6.

FIG. 3 is the table showing the magnetic characteristics of the magnetic recording mediums 3 of the single magnetic layer 2 (examples (1) to (22)) respectively made of the magnetic paints A to J; FIG. 4 is the table showing the characteristics of the double-layer magnetic recording mediums 6 (examples (1) to (17)) according to the invention; FIG. 5 is the table showing characteristics of the double-layer magnetic recording medium 6 (examples (18) to (22)) when thickness t$_2$ of the upper magnetic layer 5 thereof is varied; and FIG. 6 is the table showing the characteristics of the double-layer magnetic recording mediums 6 (examples (23) to (28)) when thickness t$_1$ of the lower magnetic layer 4 thereof is varied.

The magnetic recording medium (magnetic tape) used for the above measurements was an audio tape which is cut as ⅛ inch in width. Further, the respective characteristics are measured by the following manner.

The residual magnetic flux density Br is measured under the external magnetic field of 6000 Oe and the unit thereof is Gauss.

The coercive force $H_c$ is the coercive force measured under the external magnetic field of 6000 Oe in unit of Oersted (Oe).

MOL, maximum output level was measured at 315 Hz and 10 kHz. The value at 315 Hz was a maximum playback output with 3% third harmonic distortion of a 315 Hz signal recorded with varying its input level at the saturated bias current, expressed as the difference from the reference tape. The value at 10 kHz was a value of maximum saturation output level. The bias noise was a noise level in playback output of the recording notion, wherein the recording was made with no signal input with a standard bias current the measurement was made through an IEC A noise filter.

Each measurement was made at the tape speed of 4.8 cm/sec. Further, the MOLs (315 Hz, 10 kHz) and bias noise are respectively relative values (dB) to that of the single layer (example (5)) in the table of FIG. 3 as a reference (0 dB).

From the tables of FIGS. 3 to 6, it was ascertained that the double-layer magnetic recording medium 6, in which the specific surface area of the ferro-magnetic metal powder in the upper or second magnetic layer 5 is selected larger than that in the lower or first magnetic layer 4, is low in bias noise as compared with the single-layer magnetic recording medium 3 and produces a high reproduced output over an entire frequency range from a low frequency to a high frequency.

The specific surface are of the ferro-magnetic metal powder in the first magnetic layer 4 is preferred in the range of 20 to 40 m$^2$/g because if it is out of this range, the reproduced output in a low frequency range is lowered. Further, the specific surface area of the ferromagnetic metal powder in the second magnetic layer 5 is desired in the range of 40 to 150 m$^2$/g because if it becomes out of this range, the bias noise can not be reduced. The thickness $t_1$ of the first magnetic layer 4 is desired to be more than 2.0$\mu$, preferably less than 6.0$\mu$ since if it is less than 2.0$\mu$, the reproduced output in a low frequency band is lowered, while if it is more than 6.0$\mu$, only the reproduced output in the low frequency band becomes too high and hence the balance in the low frequency band becomes poor. The thickness $t_2$ of the second magnetic layer 5 is desired to be in the range of 0.1 to 2.0$\mu$, since if it is less than 0.1$\mu$, the bias noise can not be reduced, while if it is more than 2.0$\mu$, the reproduced output in the low frequency band is lowered. Meanwhile, the coercive force $H_{c1}$ and residual magnetic flux density $Br_1$ of the first magnetic layer 4 are desired to be in the ranges of 800 to 1500 Oe and 3000 to 5000 Gausses (preferably 3500 to 5000 Gausses), because as to the $Br_1$, when it becomes out of the range from 3000 to 5000 Gausses, the output in the low frequency band is reduced. The coercive $H_{c2}$ and residual magnetic flux density $Br_2$ of the second magnetic layer 5 are desired to be 1000 to 2500 Oe and 2000 to 3000 Gausses, respectively. The reason is that if $H_{c2}$ becomes out of the range of 1000 to 2500 Oe, the high frequency range is not extended. Further it is preferred that the coercive force $H_{c2}$ of the second magnetic layer 5 is desired to be selected equal to or more than that $H_{c1}$ of the first magnetic layer 4.

According to the magnetic recording medium 6 of the present invention in which the first and second magnetic layers 4 and 5 are sequentially formed in this order on the non-magnetic substrate 1 as shown in FIG. 2, based upon the measured results in the tables of FIGS. 4 to 6, the first magnetic layer 4 is formed by coating the ferro-magnetic metal powder whose specific surface area measured by the BET adsorption method is 20 to 40 m$^2$/g, whose coercive force $H_{c1}$ is 800 to 1500 Oe, whose residual magnetic flux density $Br_1$ is 3000 to 5000 Gausses and whose thickness $t_1$ is more than 2.0$\mu$, while the second magnetic layer 5 is formed on the first magnetic layer 4 by coating thereon the ferromagnetic metal powder whose specific surface area measured by BET adsorption method is 40 to 150 m$^2$/g, whose coercive force $H_{c2}$ is 1000 to 2500 Oe, whose residual magnetic flux density Br is 2000 to 3000 Gausses and whose thickness $t_2$ is in the range of 0.1 to 2.0$\mu$. Further, in this case, it is selected that $H_{c1} \leq H_{c2}$ is satisfied.

According to the magnetic recording medium of the present invention described as above, while the reproduced output therefrom can be maintained high over all the frequency band, the bias noise can be reduced. Hence, the magnetic recording medium of this invention is superior as compared with the prior art single-layer magnetic recording medium (such as a metal tape and so on).

The above description is given on preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A magnetic recording medium, comprising:
   (a) a non-magnetic substrate;
   (b) a first magnetic layer composed mainly of magnetic powder and binder and formed on said non-magnetic substrate; and
   (c) a second magnetic layer composed mainly of magnetic powder and binder and formed on said first magnetic layer, the magnetic powder of said first magnetic layer being made of ferro-magnetic metal powder which has a specific surface area of 20 to 40 m$^2$/g measured by BET adsorption method, said first magnetic layer having coercive force $H_{c1}$ of 800 to 1500 Oe, residual magnetic flux density of 3000 to 5000 Gausses and a thickness of more than 2$\mu$, the magnetic powder of said second magnetic layer being made of ferro-magnetic metal powder which has a specific surface area of 40 to 150 m$^2$/g measured by the BET adsorption method, said second magnetic layer having coercive force $H_{c2}$ of 1000 to 2500 Oe, residual magnetic flux density of 2000 to 3000 Gausses and a thickness 0.1 to 2$\mu$, and said coercive forces $H_{c1}$ and $H_{c2}$ being selected to satisfy $H_{c1} \leq H_{c2}$, said medium as a result of the aforementioned specific surface areas having a lower bias noise than exists when only a single magnetic layer is present.

2. A magnetic recording medium according to claim 1, wherein the thickness of said first magnetic layer is more than 2 and less than 6 microns.

3. A magnetic recording medium according to claim 1, wherein:
   the residual magnetic flux density of the first magnetic layer is in the range from 3500–5000 gauss.

* * * * *